(Model.)
G. A. WATERHOUSE.
ANIMAL RELEASING DEVICE.
No. 401,914. Patented Apr. 23, 1889.
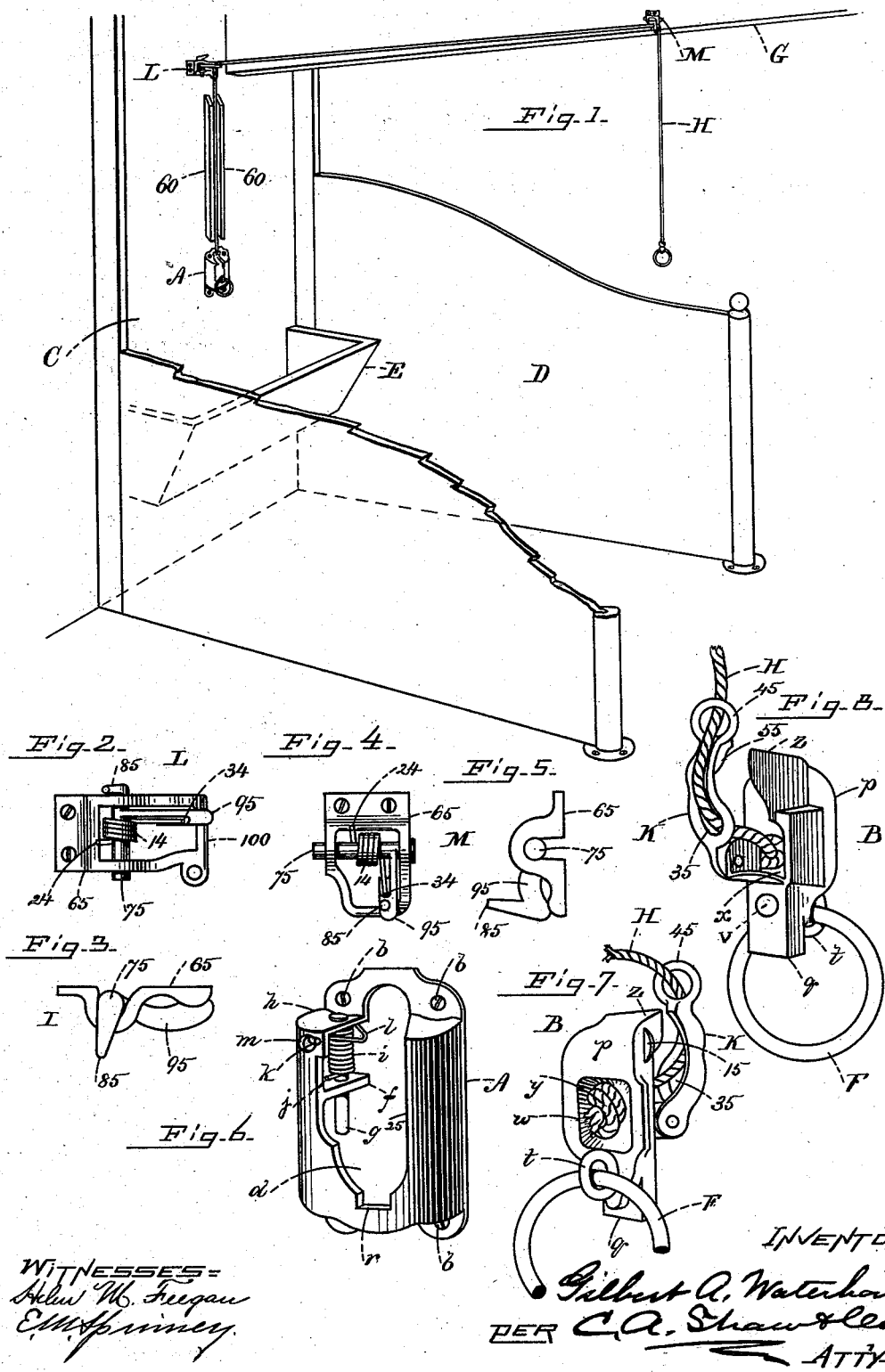
WITNESSES:
Helen M. Feegan
E. M. Spinney
INVENTOR:
Gilbert A. Waterhouse
PER C. A. Shaw & Co.,
ATTYS.

UNITED STATES PATENT OFFICE.

GILBERT A. WATERHOUSE, OF QUINCY, MASSACHUSETTS.

ANIMAL-RELEASING DEVICE.

SPECIFICATION forming part of Letters Patent No. 401,914, dated April 23, 1889.

Application filed October 27, 1888. Serial No. 289,260. (Model.)

*To all whom it may concern:*

Be it known that I, GILBERT A. WATERHOUSE, of Quincy, in the county of Norfolk, State of Massachusetts, have invented a certain new and useful Improvement in Animal-Releasing Devices, of which the following is a description sufficiently full, clear, and exact to enable any person skilled in the art or science to which said invention appertains to make and use the same, reference being had to the accompanying drawings, forming part of this specification, in which—

Figure 1 is a perspective view of a stall, representing my improvement in use; Figs. 2 and 3, enlarged front and side elevations, respectively, of one of the spring-clamps removed; Figs. 4 and 5, like views showing another form of the clamp; Fig. 6, a front elevation of the holder of the hitch proper detached; and Figs. 7 and 8, respectively, front and rear elevations of the bar of the hitch proper removed from the holder.

Like letters and figures of reference indicate corresponding parts in the different figures of the drawings.

My invention relates to that class of animal-releasing devices by which a horse or other animal secured by means of a halter can be readily released without going into the stall; and it consists in certain novel features, as hereinafter fully set forth and claimed, the object being to produce a simpler, cheaper, and more effective device of this character than is now in ordinary use.

The nature and operation of the improvement will be readily understood by all conversant with such matters from the following explanation.

In the drawings, A represents the body of the hitch proper, and B the bar, considered as a whole. The body consists of an iron case or box, which is preferably secured centrally to the wall C at the head of the stall D, directly over the manger E, by screws *b*. A vertical slot, *d*, is formed in the front and top of the body A, the sides of said slot being irregular, as shown in Fig. 6, and adapted to receive the bar B, hereinafter described. A projecting arm or bracket, *f*, is formed in the body A, at one side of said slot, and a vertically-arranged pin, *g*, is secured in said bracket and the top *h* of said body. A stiff coiled spring, *i*, is disposed around the pin *g*, its lower end, *j*, engaging the inner wall of the body, and its upper end, *k*, bent to form a projection, *l*, extending transversely into the slot *d*, said end being carried through a hole, *m*, in the front of the body. The spring *i* acts torsionally to force its projection *l* into the path of the bar B when in use, as hereinafter specified.

The bar B has its front face, *p*, of a shape to conform to the slot *d* in the body, the lower end, *q*, of said bar being extended downward at the rear to project into the body behind and below the bottom *r* of the slot *d*. An eye, *t*, is secured to the lower portion of the bar by a bolt, *v*, and an ordinary halter-ring, F, is disposed in said eye. A depression, *w*, is formed in the face of the bar, and a hole, *x*, passes through the body of said bar through the center of said depression, the releasing-cord H being disposed in said hole and prevented from being withdrawn by a knot, *y*, which rests in the depression. The top or upper portion, *z*, of the bar is wedge-shaped and extended rearward, as shown in Fig. 7. A retaining-stud, 15, projects laterally from the upper portion of the bar, and is adapted to engage the inner side of the edge 25 of the slot *d* when in use in the body. To the rear of the bar, and at one side of the hole *x*, is pivoted an upwardly-curved lever, K, a hole, 35, being formed in the body of said lever and an eye, 45, in the upper end thereof.

The releasing-cord H is passed from the hole *x* in the body, thence through the hole 35 in the lever, and longitudinally upward over the back thereof through the eye 45. The upper forward end of the lever is beveled at 55, to conform to the side of the wedge-shaped top *z* of the bar.

The spring-clamp L (see Figs. 2 and 3) has a metallic frame or body, 65, which is secured longitudinally in the wall C, directly above the hitch proper, A. A rod, 75, is journaled transversely in the frame 65, and is provided at one end outside said frame with a handle, 85, and within said frame with a laterally-projecting curved arm, 95, the free end of which engages the forward end, 100, of the frame. A stiff coiled spring, 14, is disposed on the rod 75, one end, 24, of which rests on the frame 65, and the opposite end, 34, on the top of the arm 95, said spring acting torsionally to hold said arm in engagement with the frame.

The spring-clamp M (shown in Figs. 4 and 5) is of the same general construction as the clamp L, its handle 85, however, being disposed on the free end of the arm 95, the purpose of said handles in both cases being to raise said arms to insert the releasing-cord H between them and the frame.

The clamp M is secured in a vertical position to the ceiling or a beam, G, over the rear of the stall.

The bar B is disposed in the body A through the slot d. The projection l on the spring i, pressing against the wedge portion z of said bar, prevents the retaining-stud 15 from accidentally slipping past the edge 25 of said slot.

The animal is secured in the usual manner to the halter-ring F, which, being disposed in the lower part of the bar, prevents any pressure against the projection l of the spring when strain is exerted on the ring, such strain being resisted by the projection q on the lower end of the bar. The releasing-cord H is passed upward from the lever K between vertical guards 60, secured to the wall C, and designed to prevent the animal from biting or otherwise interfering with the cord, and is detachably secured under the curved arm 95 of the clamp L; thence it passes rearward over the stall, and is secured in a similar manner in the clamp M, its end hanging free and where it can be readily reached, as shown in Fig. 1.

When it becomes necessary, in case of fire or from other cause, to release the animal in the stall, the free end of the cord H is grasped and strain exerted thereon sufficient to release it from the spring-clamps L and M. By continuing to pull on the cord the lever K on the bar B is drawn forward and its beveled edge 55 forced between the edge 25 of the slot d and the wedge portion z of said bar, thereby moving the bar to one side and overcoming the pressure of the projection l on the spring i until the retaining-stud 15 is freed from the body, when the bar will readily be drawn from the slot and the animal released.

The releasing-cords of several stalls may be so connected and arranged as to free the animals therein simultaneously.

Having thus explained my invention, what I claim is—

1. In an animal-releasing device, the combination of a hollow body provided with a slot for receiving a detachable bar, a bar provided with a wedge-shaped inwardly-projecting portion and a retaining-stud on its side, a coiled spring disposed in said body and detachably securing the bar therein, and a lever pivoted to said bar and adapted to overcome the pressure of said spring, whereby the bar may be released from the body, substantially as set forth.

2. In an animal-releasing device, the combination of a hollow body provided with a slot for receiving a releasing-bar, a bar adapted to be disposed in said body and provided with an inwardly-projecting wedge, a retaining-stud, and a central opening for receiving a releasing-cord, a spring disposed in said body for detachably securing the bar therein, a lever pivoted to said bar and provided with openings for the releasing-cord and a beveled portion to engage the wedge on said bar, and a releasing-cord disposed in the openings in said bar and lever, whereby the bar may be released from said body when the cord is pulled, substantially as described.

3. In an animal-releasing device, the hollow body A, having the slot d, in combination with the spring i, provided with the projection l, and the bar B, provided with the stud 15, said bar being fitted to enter said body and be detachably secured therein by said spring, substantially as set forth.

4. In an animal-releasing device, the combination of the body A, provided with the slot d, the bar B, adapted to enter said slot, and provided with the wedge portion z and stud 15, the spring i, having the projection l, for engaging said bar and detachably securing it in said body, and the lever K, provided with the beveled edge 55, whereby the pressure of said spring may be overcome and the bar released, substantially as described.

5. In an animal-releasing device, the bar B, provided with the hole x, wedge z, and a stud, 15, in combination with the body A, provided with the slot d, for receiving said bar, the spring i, for detachably securing the bar within said body, the lever K, pivoted to said bar and provided with the opening 35 and eye 45, and the cord H, disposed in said bar and lever, substantially as and for the purpose described.

6. In an animal-releasing device, the combination of the body A, provided with the slot d, the bar B, adapted to be disposed in said body and provided with the extension q, ring F, opening x, wedge z, and retaining-stud 15, the spring i, disposed in said body and acting torsionally to secure the bar therein, the lever K, pivoted to said bar and provided with the opening 35, eye 45, and beveled portion 55, the cord H, disposed in the opening in said bar and lever, and the spring-clamps L M, for detachably supporting said cord, all being arranged substantially as described.

GILBERT A. WATERHOUSE.

Witnesses:
O. M. SHAW,
E. M. SPINNEY.